Nov. 16, 1948.  E. B. SNEAD  2,454,101
DUMPING VEHICLE
Filed March 18, 1946  7 Sheets-Sheet 1

EDWIN B. SNEAD
INVENTOR.

BY Schley and Schley
Attorneys.

Nov. 16, 1948.  E. B. SNEAD  2,454,101
DUMPING VEHICLE

Filed March 18, 1946  7 Sheets-Sheet 2

EDWIN B. SNEAD
INVENTOR.

BY Schley and Schley
Attorneys

EDWIN B. SNEAD
INVENTOR.

BY Schley and Schley
Attorneys.

_Fig. 6._

_Fig. 17._

EDWIN B. SNEAD.
INVENTOR.

BY Schley and Schley

Attorneys.

Nov. 16, 1948.　　　　　E. B. SNÉAD　　　　　2,454,101
DUMPING VEHICLE

Filed March 18, 1946　　　　　　　　　　　7 Sheets-Sheet 6

EDWIN B. SNEAD
INVENTOR.

BY Schley and Schley
Attorneys

Patented Nov. 16, 1948

2,454,101

UNITED STATES PATENT OFFICE 2,454,101

DUMPING VEHICLE

Edwin B. Snead, Austin, Tex.

Application March 18, 1946, Serial No. 655,204

21 Claims. (Cl. 214—83.22)

This invention relates to new and useful improvements in dumping vehicles.

One object of the invention is to provide an improved vehicle adapted to contain a plurality of batches of material and arranged so that one or more of said batches may be discharged or dumped from the rear end of the vehicle, whereby the vehicle may be driven along a route or road and one or more batches dumped at selected points, thus doing in one trip what would ordinarily require several trips.

Another object of the invention is to provide an improved vehicle adapted to contain a plurality of measured batches of material, whereby batches of material of predetermined cubical content may be individually dumped at will.

A further object of the invention is to provide an improved dumping vehicle having progressively movable transverse division members or partitions which are mechanically propelled longitudinally of the vehicle body and controlled by fluid hand-operated means, whereby the operator may dump one or more divisions simply by manipulating the hand control.

Still another object of the invention is to provide a vehicle of the character described having means for automatically stopping the progress of the dumping after each batch is dumped; together with means for automatically stopping the operating means when all of the batches have been dumped so as to position the division members properly for reloading.

A further object of the invention is to provide improved means for returning the partitions to loading position after the last batch of material has been dumped.

A construction designed to carry out the invention will be hereinafter described together with other features of the invention.

The invention will be more readily understood from a reading of the following specification and by reference to the accompanying drawings, wherein an example of the invention is shown, and wherein.

In the drawings, the numeral 10 designates generally, a vehicle body of the truck trailer type. The body is mounted on a longitudinal frame 12 which includes elongate side channel beams 13 and is supported at its forward end on a turntable 14 which is carried on the platform 15 of a suitable motor truck 16. The details of the turntable and the motor truck are immaterial and a detailed description of the same is considered unnecessary. The rear end of the trailer frame is carried on a subframe 17 which is supported on a plurality of ground wheels 18 by a spring suspension which will be hereinafter described. Spaced transverse bolsters 19 are fastened on the beams in any suitable manner and overhang the same on each side.

The body 10 proper includes a plate-metal floor 20 secured on the bolsters in any suitable manner. This floor may be made in sections and any design may be employed so long as the upper surface of the floor is smooth and free from obstructions. The floor preferably extends transversely to the ends of the bolsters 19 and upright plate-metal sides 21 are suitably fastened on top of the floor, as by welding, and are offset inwardly from the sides of the floor. These sides are braced by inclined metal standards 22 suitably secured to the outer faces of the sides and to the floor externally of said sides. So long as the inner faces of the sides are continuous and free from obstructions, the particular design is unessential. When such material as a dry concrete mix, sand or other material is carried in the body, it is necessary that the inner faces of the floor and sides be smooth and unbroken so that such material may be readily moved or slid rearwardly in said body.

For the purpose of dividing the vehicle load into batches of pre-determined cubical content, as well as for the purpose of moving such batches rearwardly, a plurality of upright division members or partitions 23 extend transversely within the body at the properly spaced intervals. Each partition includes upon its front side, a bottom stripper plate 24 and upright side stripper plates 25, each of which is provided with slots 26 for receiving bolts 27, whereby the stripper plates may be adjusted so as to have sliding engagement with the inner faces of the floor 20 and the sides 21. The partitions have their upper edges terminating a substantial distance below the edges of the sides 21 as is clearly indicated in Figs. 1, 3 and 7. The partitions 23 are preferably made of heavy metallic plates but may be formed in any suitable manner.

Figure 4:
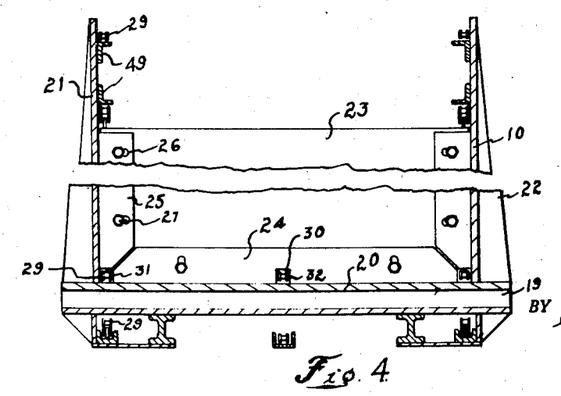
Fig. 4 is a transverse sectional view between two of the partitions looking toward the rear of the trailer.
Figure 5:
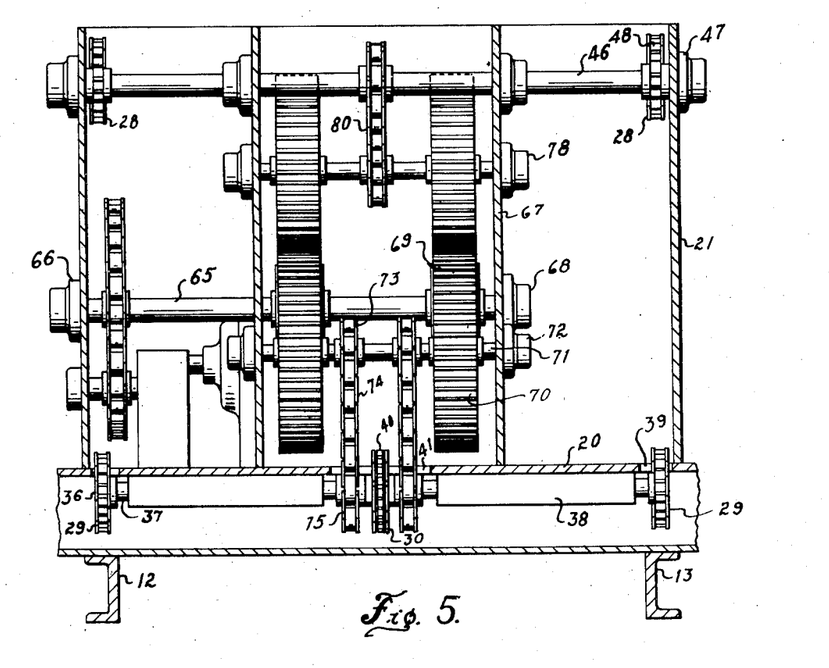
Fig. 5 is transverse sectional view looking toward the front end of the vehicle to show the operating mechanism, the head plate being omitted.
Figure 6:
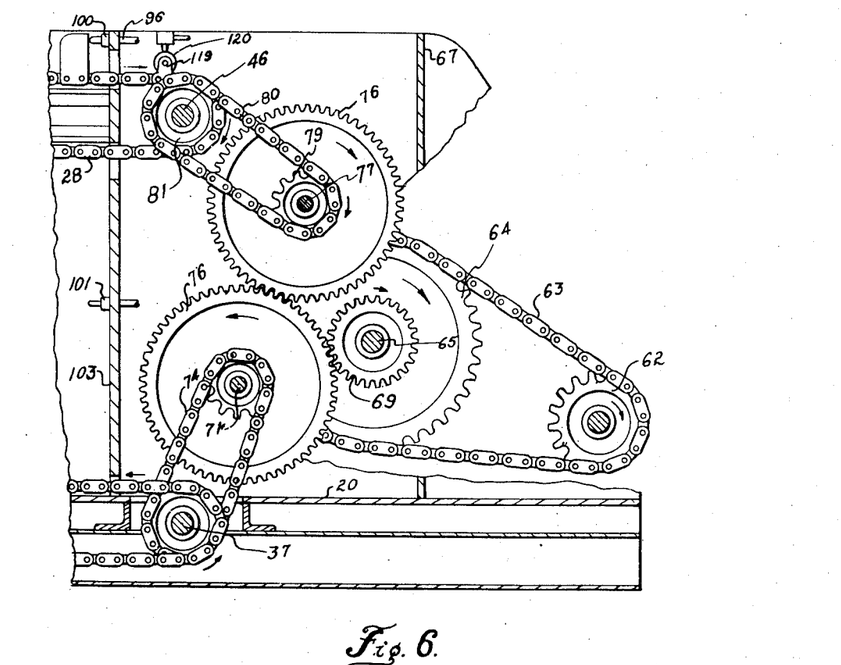
Fig. 6 is a partial longitudinal vertical sectional view of the forward end of the trailer.
Figure 7:
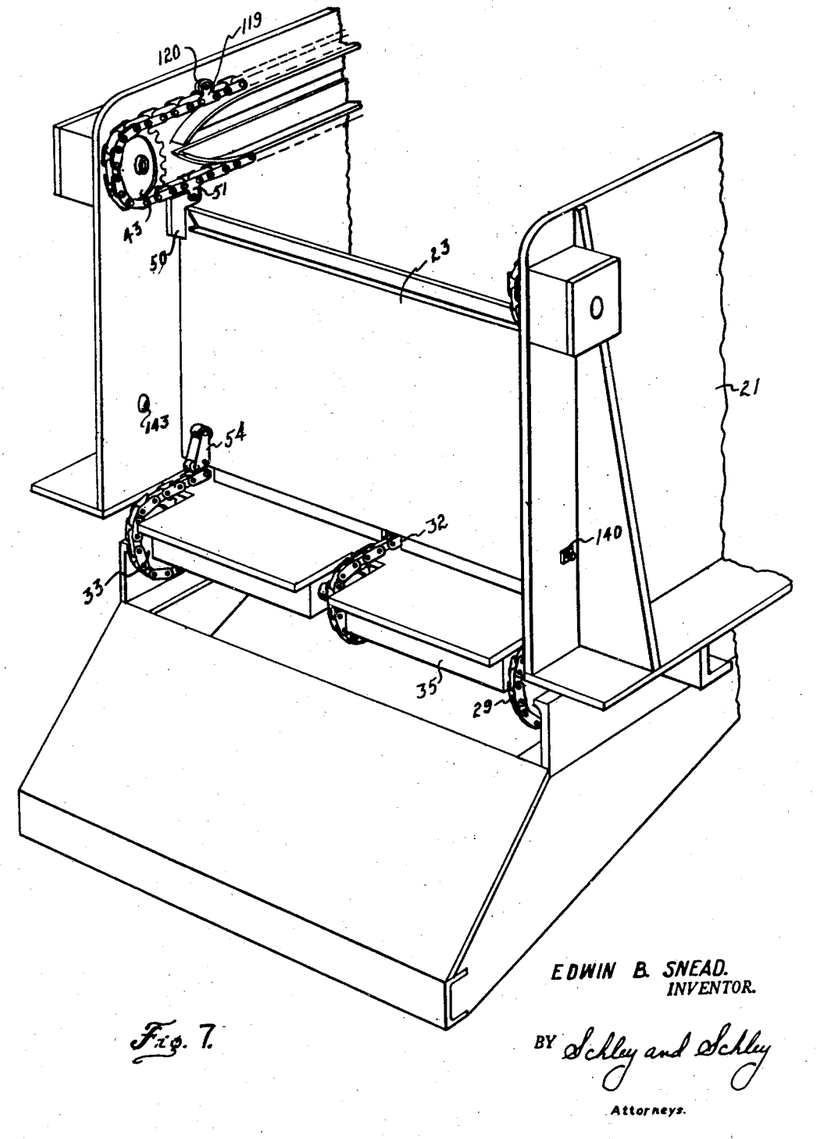
Fig. 7 is an isometric view of the rear portion of the trailer.
Figure 16:
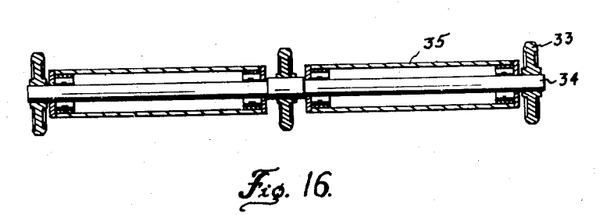
Fig. 16 is a longitudinal sectional view of the lower rear shaft mechanism.

For progressively moving the partitions, endless upper sprocket chains 28 and endless bottom chains 29 are provided longitudinally of the body contiguous to the inner faces of the sides 21; a central endless chain 30 being disposed longitudinally of the body. The lower edge of each partition terminates above the lower edge of its bottom stripper plate 24 and the lower ends of the plates 25 are cut off at 31 (Figs. 4, 7 and 8) so that the bottom chains 29 may rest upon the floor 20 and the partitions may swing over said chains. Each bottom stripper plate is provided with a notch 32 for receiving the central chain 30. The rear ends of the chains 29 and 30 are carried by sprocket wheels 33 fastened on a transverse shaft 34 (Figs. 7 and 16) journaled in roller bearing boxes 35 carried at the rear end of the trailer frame. The forward ends of the chains 29 are mounted on sprocket wheels 36 fastened on a drive shaft 37 at the forward end of the trailer frame. The drive shaft 37 is journaled in roller bearing hanger sleeves 38 suspended from the floor 20 which latter is provided with slots 39 through which the sprocket wheels 36 and the chains 29 extend (Fig. 5). The forward end of the central chain 30 is supported on a sprocket wheel 40 fastened on the center of the drive shaft 37 and extending through a slot 41 in the floor 20 (Figs. 5 and 6). The rear end of the central chain 30 is supported on a sprocket wheel 42 fastened on the shaft 34 (Figs. 7 and 16).

Figure 10:
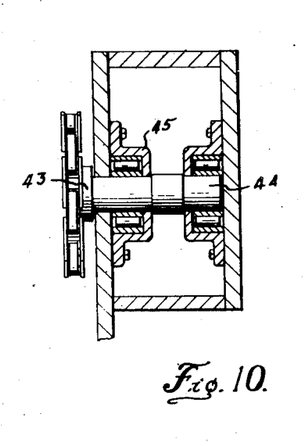
Fig. 10 is a sectional detail of one of the chain mountings.

The rear end of the floor is provided with slots 43 through which the sprocket wheels 36 and 42, together with chains 29 and 30, extend. The rear ends of the upper chains 28 are supported on sprocket wheels 43 which are journaled on stub shafts 44 mounted in bearing boxes 45 carried by the body sides 21 (Figs. 7 and 10). The forward ends of the chains 28 are supported on sprocket wheels 48 fastened on a drive shaft 46 having its ends journaled in bearing boxes 47 carried by the body sides 21 at their forward ends (Figs. 5 and 6). In order to support and maintain the upper and lower runs of the chains 28, tracks 49 are secured to the inner faces of the sides 21 and are angular in cross-section. The rear ends of the tracks are curved toward each other (Fig. 3) so as not to interfere with the operation of attachments carried by the chains. The upper runs of the chains travel on the upper tracks 49, while the lower tracks 49 are disposed immediately above the lower runs of the chains to prevent upward displacement thereof.

Figure 3:
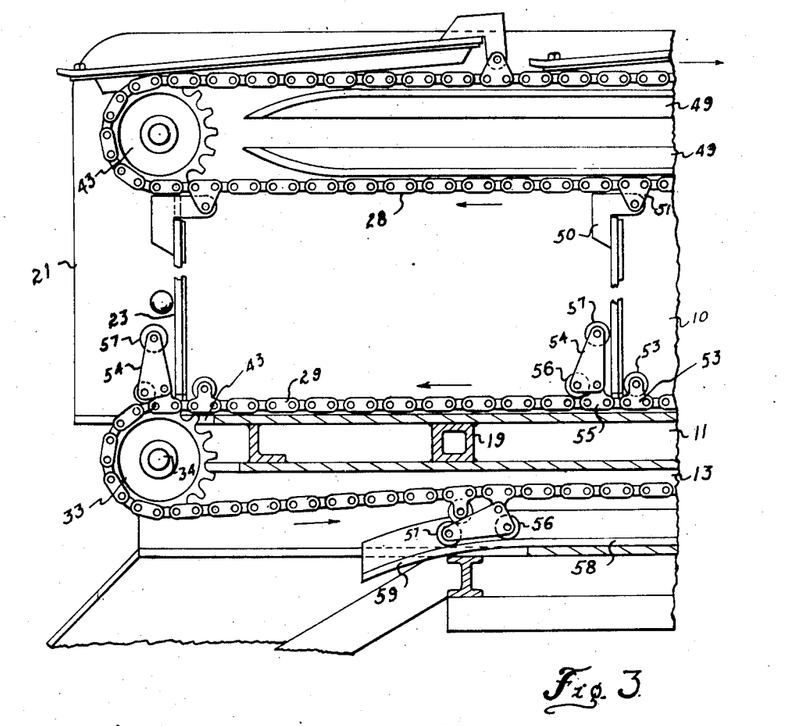
Fig. 3 is an enlarged longitudinal sectional view of the rear portion of the trailer.
Figure 8:
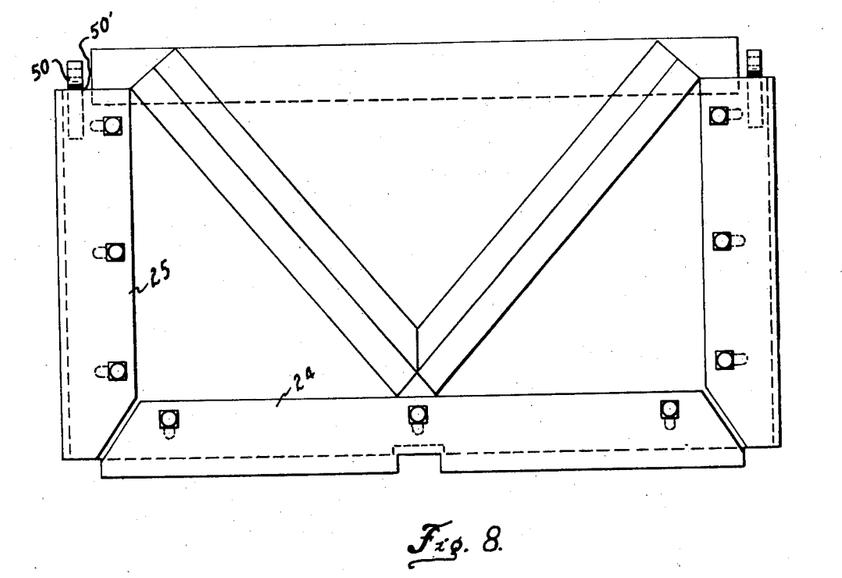
Fig. 8 is an elevation of the front side of one of the partitions.
Figure 9:
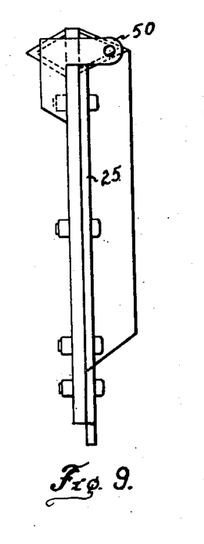
Fig. 9 is an end elevation of the same.

The partitions 23 are carried by angular hangers 50 which are pivoted in adapters 51 carried by the chain 28. The hangers are preferably welded to the rear sides of the partitions 23 (Figs. 3, 7 and 8). It will be noted that the partitions are notched at 50' to receive the hangers. For holding the partitions in place during their rearward travel, the bottom chains 29 and 30 carry adapters 52 (Figs. 3 and 7) in which small rollers 53 are journaled so as to bear against the lower front sides of said partitions. Triangular bracket plates 54 are pivoted at their forward lower corners on adapters 55 attached to the chains adjacent the adapters 52. At the rear corners of the plates 54, rollers 56 are journaled, and these rollers bear upon the chains and act to support the plates in an upright position so that rollers 57 journaled at their upper ends will bear against the rear sides of the partitions 23, as is best shown in Fig. 3. It is obvious that when the chains are caused to travel, the rearmost rollers 57 remain in engagement with the partition 23 until the bracket plates 54 pass over the center of the shaft 34 (Fig. 3) whereupon said plates are carried downwardly and out of the path of the partition so that the latter may swing outwardly as its pivoted hangers are carried rearwardly and upwardly by the chains 28. A longitudinal angular track 58 is carried by the beams 13 of the frame 12 and this track is provided with a downwardly curved horn 59 whereby the pivoted bracket plates are caused to ride onto the track and fold upwardly as is best shown in Fig. 3. The rollers 56 and 57 will ride on the track while the lower runs of the chains 29 and 30 are traveling forwardly. The partitions will swing to an approximately horizontal position and ride on the upper runs of the top chains 28 during the return travel of said chains.

Figure 1:
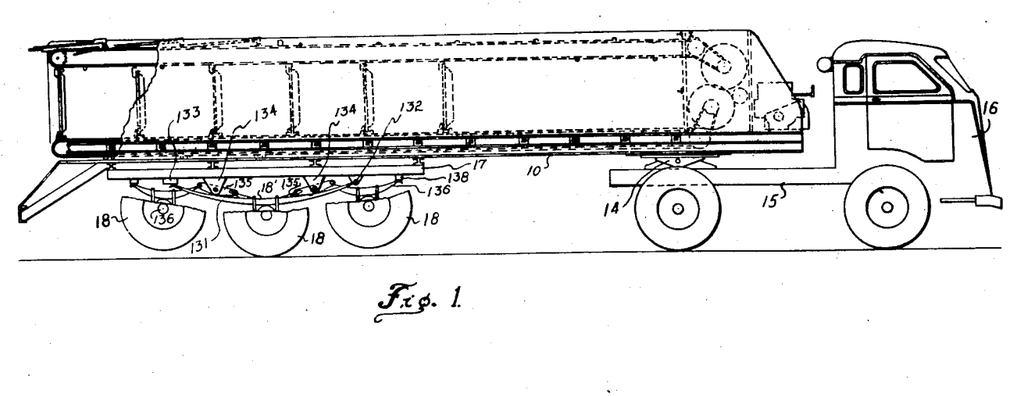
Fig. 1 is a side elevation of a dumping vehicle constructed in accordance with the invention, partly in elevation and partly in section.
Figure 2:
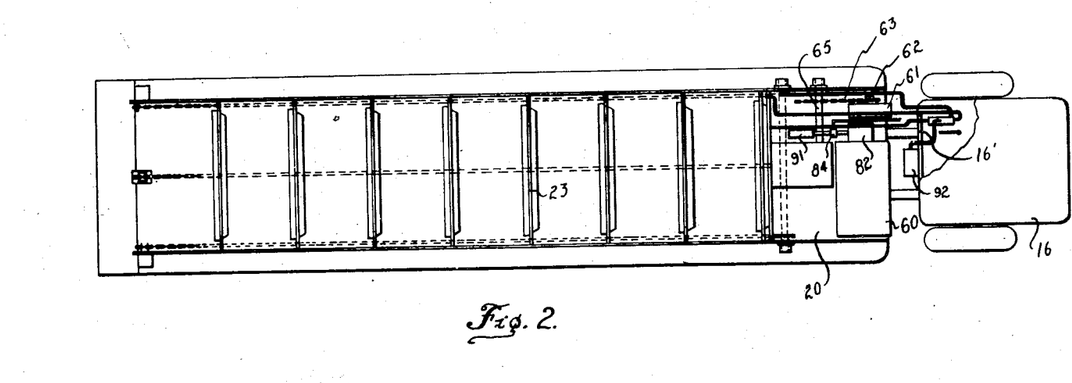
Fig. 2 is a plan view of the same, a portion of the cab being in section to illustrate the control mechanism.

It is obvious that various types of mechanism could be employed to operate the endless chains because it is only necessary to revolve the shafts 37 and 46 to accomplish this result. I prefer to mount a power plant on the forward end of the trailer body 10 which includes a transversely disposed internal combustion engine 60 suitably secured on the floor 20 and shown in Figs. 1 and 2. The engine drives a conventional reduction gearing 61, which, in turn, drives a sprocket wheel 62. One end of an endless sprocket chain 63 is supported on the wheel 62 and has its opposite end engaging around a somewhat larger sprocket wheel 64 which is fastened on a drive shaft 65 (Figs. 1, 2 and 6). The drive shaft has one end journaled in a bearing box 66 carried by one of the sides 21 and extends through the upright walls of a gear housing 67, one of which walls carries a bearing box 68 in which the end of the shaft is supported. Within the gear box, pinions 69 are fastened on the drive shaft and mesh with lower gears 70 fastened on jack shafts 71 journaled in bearing boxes 72 carried by the side walls of the housing 67. Sprocket wheels 73 secured on the jack shafts support one end of endless chains 74 which engage around sprocket wheels 75 fastened on the drive shaft 37 on each side of the sprocket wheel 40.

The gears 70 drive complementary gears 76 fastened on a jack shaft 77 journaled in bearing boxes 78 carried by the housing 67. A sprocket wheel 79 fastened on the shaft 77 drives one end of an endless chain 80, the opposite end of which is carried by a sprocket wheel 81 fastened on the drive shaft 46. The endless chains 28, 29 and 30 are driven by the shafts 37 and 46 which, in turn, are driven by the chains 74 and 80. The sprocket wheel 62, which is driven by the reduction gear 61, is revolved in a clockwise direction (Fig. 6) and by means of the chain 63, drives the sprocket wheel 64 and shaft 65 in a clockwise direction. The shaft 65 drives the pinions 69 in a clockwise direction, whereby the gears 70 are driven counterclockwise, which causes the shaft 71 to revolve in a counterclockwise direction. The shaft 71 drives the chains 74, whereby the drive shaft 37 is driven in a counterclockwise direction, which causes the upper runs of the chains 29 and 30 to travel rearwardly on the floor 20.

The gears 70 drive the gears 76 in a clockwise direction, whereby the shaft 46 is driven in a like direction by the chain 80 and this causes the lower runs of the chains 28 to travel rearwardly complementary to the chains 29 and 30. It is important that the sprocket wheels 36, 40 and 48 be driven at the same rate of speed so as to synchronize the travel of the chains 28, 29 and 30. Means for controlling the transmission of motion to the sprocket wheel 62 will be hereinafter described.

Figure 17:
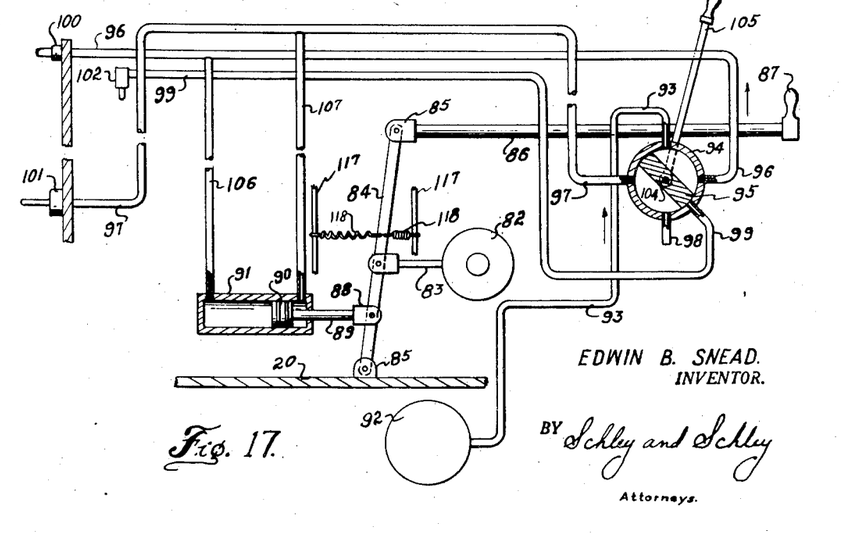
Fig. 17 is a diagrammatical view of the fluid-pressure valve system.

A clutch 82 is interposed between the engine 60 and the reduction gearing 61 (Figs. 2 and 17). This clutch is of the marine type which has three positions, which are forward and reverse, with a neutral position therebetween. The clutch is operated by a pitman 83 which is pivoted intermediate the ends of a shifting lever 84 having its lower end pivoted in a bracket 85 secured on the floor 20. The upper end of the lever 84 is pivoted in a clevis 85 fastened on the rear end of an operating shaft 86 suitably supported adjacent the rear of the cab 16 which has a window 16' through which the handle 87 of the shaft 86 may be reached. By removing this shaft longitudinally, the clutch may be thrown into any of its positions. Between the bracket 85 and the pivot of the pitman 83, a clevis 88 is pivoted to the lever and attached to the forward end of a piston rod 89. The rear end of the piston rod is attached to a piston 90 having a fluid-tight sliding fit in a cylinder 91.

Figure 11:
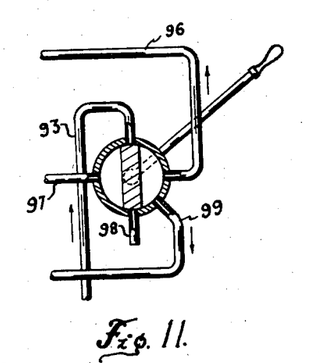
Fig. 11 is a diagrammatical view of the fluid control valve showing it in position for operating the dumping valve.

A fluid-pressure reservoir 92 is mounted in the rear of the cab 16 (Figs. 2 and 17) and a suitable pressure fluid, such as compressed air, is supplied to the reservoir in any suitable manner. An air supply pipe 93 leads from the reservoir to a control valve 94 which is illustrated in detail in Figs. 11, 12 and 17. This valve includes a cylindrical casing with a flat valve head 95 rotatably mounted therein and having fluid-tight engagement at its end with the inner surface of the valve casing. The valve has five points of communication indicated by the pipes 96, 93, 97, 98 and 99, respectively. The pipes 96, 93, 97 and 98 are spaced at 90° to each other; while the pipe 99 is located centrally between the pipes 96 and 98, all with respect to their connection with the interior of the valve.

Figure 13:
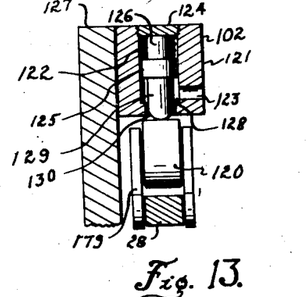
Fig. 13 is a transverse sectional view showing the dumping valve.
Figure 14:
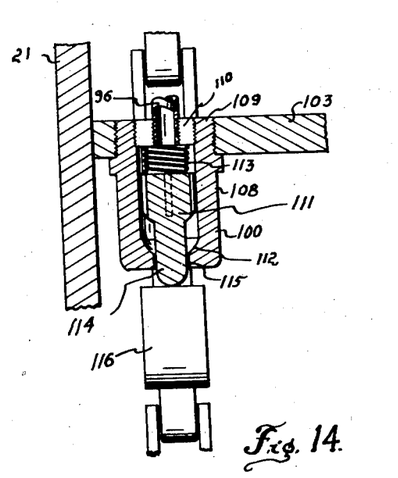
Fig. 14 is a view of the stop valve mechanism, partly in plan and partly in section.
Figure 15:
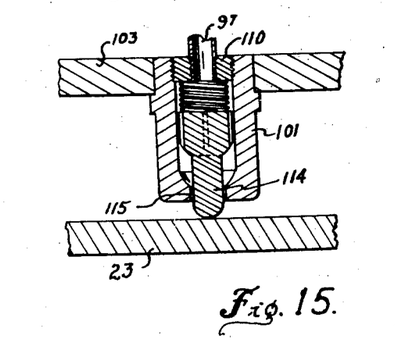
Fig. 15 is a transverse sectional view of the return stop valve.

The pipe 96 leads to a dumping stop valve 100 shown in Figs. 6 and 17 and illustrated in detail in Fig. 14. The pipe 97 leads to a return stop valve 101 (Figs. 6, 15 and 17), which valve is mounted in a transverse head plate 103 secured at the forward end of the trailer just behind the driving mechanism. The pipe 99 leads to a dumping valve 102 (Figs. 6, 13 and 17) mounted on one of the side plates 21. The pipe 98 exhausts to the atmosphere. The valve head 95 is provided with a shaft 104 which extends through the valve casing and is rigidly attached to the lower end of a hand lever 105. By swinging this hand lever, the valve head 95 may be rotated to control the flow of air with respect to the valves 100, 101 and 102 and the piston cylinder 91. A lateral 106 extends from the pipe 96 to one end of the cylinder 91; while a lateral 107 extends from the pipe 97 to said cylinder.

When the valve head 95 is in the position shown in Fig. 17, air supplied by the pipe 93 will flow to the pipe 96, all other outlets being shut off. Air will thus be supplied to the valve 100, which is illustrated in detail in Fig. 14. The valve 100 is shown in Fig. 14 in its open position, and this valve includes a cylindrical casing 108 having a screw-threaded nipple 109 at one end which is screwed into the head plate 103. The nipple is internally screw-threaded to receive a collar 110 into the center of which the pipe 96 is screwed. A winged valve head 111 is slidably confined in the bore of the casing and is forced against a concaved seat 112 at the outer end of the casing by a coiled spring 113. The valve carries an axial plunger 114 which has a loose fit in an aperture 115 in the outer end of the valve casing, the outer end of said plunger being rounded. One of the upper chains 28 carries an upstanding abutment 116 which engages the plunger and depresses the valve when the last batch has been dumped.

When the valve 100 is opened, the air in the pipe 96 is exhausted to the atmosphere through the aperture 115, as is also the air trapped in the cylinder 91, behind the piston 90 and the air trapped in the pipe 106. The clutch lever 84 swings between two upright supports 117, as is best shown in Fig. 17. Coiled springs 118 disposed on each side of the lever have their outer ends attached to the supports and their inner ends attached to the lever. When the parts are in the position shown in Fig. 17, the left-hand spring 118 will be extended and consequently, when air pressure on the piston is relieved, this spring will pull the member 84 to an intermediate position, whereby the clutch 82 will be moved to a neutral position and the transmission of motion to the chains stopped.

Figure 12:
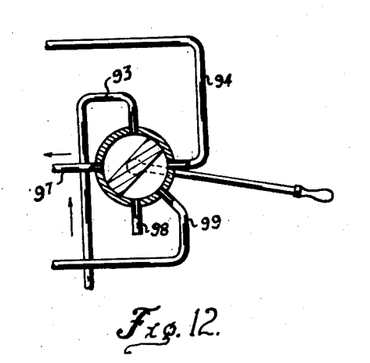
Fig. 12 is a similar view showing the valve in position for operating the return stop valve.

When all of the batches have been dumped, and it is desired to return the partitions 23 to loading position, it will be necessary for the operator to swing the valve head 95 to the position shown in Fig. 12, whereby fluid pressure will be supplied from the pipe 93 to the pipe 97 and to the valve 101, which is normally closed. When this is done, air under pressure will be supplied to the cylinder 91 by way of the pipe 107 which will move the piston 90 to the left-hand end of the cylinder (Fig. 17) whereby the clutch 82 will be shifted to a reverse position. This will cause the operating mechanism to return the partitions to their loading position. The valve 101 is substantially a duplicate of the valve 100 with the exception that the pipe 97 is screwed into the plug 110 and therefore, the same reference numerals will be used for the sake of simplicity. When the foremost partition 23 engages the plunger 114 of the valve 101, the valve will be depressed or opened, thus permitting the air to bleed to the atmosphere through the aperture 115. This will release air from the pipes 97 and 107 whereby the springs 118 will return the clutch to a neutral position.

For controlling the dumping, one of the upper chains 28 carries upstanding adapter brackets 119 (Figs. 1, 6, 7 and 13) which, in turn, carry rollers 120. These adapter brackets are spaced on the chain so that when each partition forward of the rearmost partition reaches its extreme rear position ready for dumping, said roller operates the valve 102. The valve 102 includes a valve block 121 secured to one of the side walls 21 and is provided with a vertical bore 122 having a port 123 into which the end of the pipe 99 screws. The upper end of the bore is closed by a screw-threaded plug 124, as is clearly shown in Fig. 13. A valve head 125 has a fluid-tight sliding fit in the bore and is provided with an upstanding axial stem 126 which engages the plug to limit the upward movement of the valve head. A coiled spring 127 surrounds the stem between the valve head and the plug and acts to force said head down onto an annular seat 128 at the bottom of the bore. The valve head carries a plunger 129 which has a sliding fit in an aperture 130 surrounded by the valve seat so that when the valve is in its depressed or opened position, as shown in Fig. 13, the air will be exhausted to the atmosphere. The roller 120 engages the lower rounded end of the plunger and opens the valve.

In order to start the various chains traveling to unload the batches, the clutch lever 84 will have to be swung to the forward position shown in Fig. 17, and the hand lever 105 will have to be swung to the position also shown in this figure. However, since the valve 101 will be open because the plunger thereof will still be in engagement with the foremost partition 23, it is obvious that no air will be trapped in the pipe 107. By swinging the hand lever 105 to the position shown in Fig. 12, the pipes 96 and 99 will be connected to the exhaust pipe 98, and thus, if desired, the clutch may be shifted by means of the shaft 86 to start the chains moving. If the operator desires to use the air pressure to start the chains, he may shift the hand lever 105 to the position shown in Fig. 17, which will supply air from the pipe 93 to the pipe 96, from which the lateral 106 will carry such air to the cylinder 91 and thereby move the piston 90 to the right sufficiently to shift the clutch into its forward position. The piston will reach this position before the valve 101 is closed and therefore, any air trapped in the pipes 97 and 107 will be static.

In describing the operation it will be assumed that the body has been loaded and batches of material are contained between the partitions 23. The foremost partition is in engagement with the plunger 114 of valve 101 whereby said valve is open to the atmosphere, the hand valve is in the position shown in Fig. 11 and the clutch lever 84 is in a neutral position, with the engine 60 running. The valves 100 and 102 will be closed. The clutch 82 can be engaged either by operating the shaft 86 or by swinging the lever 105. When the lever 84 is in a neutral position the piston 90 will be intermediate the pipes 106 and 107.

If the hand lever 105 is swung to the position shown in Figs. 17 air will be supplied from the pipe 93 to the pipes 96 and 106 which will displace the piston 90 to the left, the pipes 107 and 97 being open to the atmosphere. This will shift the clutch into its forward position and start the chains moving, whereby the partitions will be moved rearwardly. When the foremost partition 23 moves away from the plunger 114 of the valve 101, said valve will be closed. The chains continue to move and the rearmost partition is swung rearwardly, as has been described, so the following partition is pushing the batch from the rear end of the floor 20.

When the second partition reaches its rear position the first batch will have been dumped and at this time the foremost roller 120 on the chain 28 will engage and depress the plunger 129 of the dumping valve 102. In order to cause the valve 102 to function the operator will have previously swung the hand valve from the position shown in Fig. 17 to the dotted position shown in Fig. 12, whereby air will pass to the pipe 99 and thus when the dumping valve 102 is opened, air will pass from the cylinder 91 by way of the pipe 106, which will permit the spring 118 to pull the lever 84 to a neutral position and stop motion of the chains.

This operation will be repeated each time a batch is dumped. When the last batch has been dumped and the lever 105 has been swung to the position shown in Fig. 17, the parts will be in position for operation of the valve 100, no roller 120 being provided for the last dump, and consequently, the lever 105 may remain in the position shown in Fig. 17. When the last batch has been dumped the abutment 116 will engage and depress the plunger 114 of the return valve 100, whereby the pipes 96 and 106 will bleed to the atmosphere, thus permitting the spring 118 to return the lever 84 to neutral and stop the chains.

In order to reverse the travel of the chains and partitions the lever 105 is shifted to the position shown in Fig. 12, which will supply air from the pipe 93 to the pipes 97 and 107, whereby the piston 90 will be moved to the left (Fig. 17), thus shifting the clutch lever 84 to the reverse position. When the foremost partition strikes and engages the plunger 114 of the return stop valve 101, air in the pipes 97 and 107 will be released to the atmosphere, whereby the clutch 82 will be shifted to a neutral position and the travel of the chains stopped.

Figure 18:
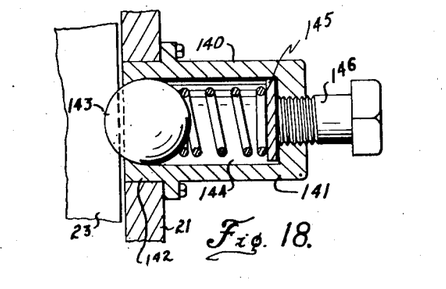
Fig. 18 is a sectional view of the partition stop.

When each partition 25 swings downward into the rear end of the body, on the return movement of the chains, said partition must be arrested so that its lower edge will be positioned between the rollers 53 and the bracket plates 54. To accomplish this result, spring stops 140 are mounted in the side walls 21 (Figs. 7 and 18). Each stop includes a flanged housing 141 having its inner end inserted in an opening 142 in the side wall and flush with the inner surface thereof. A stop ball 143 seated in the inner end of the housing projects into the body in the path of the partition. The ball is sustained by a coiled spring 144 in the housing which is compressed by the head 145 of a screw-threaded plunger 146. The springs 144 are under sufficient compression to cause the balls to resist the downward swing of the partitions, but to yield as the bracket plates move the partitions forwardly.

It is desirable to support the rear end of the trailer body so that only the central wheels 18 will engage the road when the truck is unloaded and when the truck is loaded, the end wheels 18 will be moved downward into engagement with the road. While any suitable means may be employed, I prefer to secure the axle 18' of the central wheels to the center of elongated elliptical springs 131. The forward ends of the springs 131 are pivoted in shackles 132 depending from the subframe 17. The rear ends of the springs slide on shoes 133, also carried by said frame. Hangers 134 depend from the subframe and rockers 135 are pivoted intermediate their ends in said hangers. The outer ends of these rockers are secured to the inner ends of relatively elliptical springs 136, the outer ends of which slide on shoes 137. The axles 181 of the end wheels are secured to the central portions of the springs 136. The inner ends of the rockers 135 have loose connection with brackets 138 carried by the springs 131. This arrangement permits the end wheels 18 to move up and down and at the same time provides adequate spring suspension.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A dumping vehicle including, a portable body having an imperforate floor, endless chains carried by said body, spaced transverse partitions across the body in close proximity to the floor movable longitudinally of said body carried by said chains, each partition extending continuously from one side of the body to the opposite side thereof, whereby a batch of loose material may be wholly confined between adjacent partitions and moved progressively rearwardly as preceding batches are discharged from the body, means for driving the chains, and means for automatically stopping travel of the chains when a partition reaches a predetermined dumping position.

2. A dumping vehicle including, an elongate portable body having a continuous smooth imperforate floor and continuous smooth imperforate sides, endless chains carried by said body, spaced transverse partitions extending continuously across the body and having bottom and side edges in close proximity to the floor and sides of said body and movable longitudinally of said body carried by said chains, means for driving the chains, and means for automatically stopping travel of the chains when a partition reaches a predetermined dumping position.

3. A dumping vehicle including, an elongate body, upper and lower conveying means mounted longitudinally of the floor and on each side of the body, spaced transversed partitions in the body carried by said conveying means extending continuously across the body from one upper conveying means to the upper conveying means, whereby each partition is carried by at least three conveying means, and means for operating the conveying means.

4. A dumping vehicle as set forth in claim 3, and means for automatically stopping the conveying means when each partition reaches a predetermined dumping position.

5. A dumping vehicle including, an elongate body having a floor, upper conveyor chains mounted longitudinally on each side of the body, lower conveyor chains mounted longitudinally of the body adjacent the floor, spaced transverse partitions movable longitudinally of the body, hangers carried by the upper chains attached to the partitions, and retaining means carried by the lower chains detachably engaging the lower portions of the partitions.

6. A dumping vehicle as set forth in claim 5 and tracks extending longitudinally of the chains adjacent thereto.

7. A dumping vehicle as set forth in claim 5 and stripper plates mounted on the edges of the partitions.

8. A dumping vehicle including, an elongate body, upper conveyor chains mounted longitudinally of the body, lower conveyor chains mounted longitudinally of the body, spaced transverse partitions movable longitudinally of the body, hangers carried by the upper chains attached to the partitions, retaining means carried by the lower chains receiving the lower portions of the partitions, means for intermittently moving the chains to dump material confined between the partitions, and means for moving the chains in a reverse direction to return the partitions to loading positions.

9. A dumping vehicle including, an elongate body having a stationary floor and adapted to contain a plurality of separate batches of loose material, transverse upright partitions separating and confining individual batches, and means for moving said partitions step by step rearwardly in said body to slide said batches on the floor of the body and individually dump them from the body.

10. A dumping vehicle including, an elongate body having a floor and upright sides, endless upper conveyor chains carried within the body at the sides thereof, an endless lower chain movable along the floor of the body, partitions pivotally suspended from the upper chains and detachably engaging the lower chain within the body, and means for travelling said chains to move said partitions longitudinally of the body.

11. A dumping vehicle including, an elongate body, endless upper conveyor chains carried by the body, partitions pivotally suspended from the chains in the body, means for travelling said chains to move said partitions longitudinally of the body, and travelling means along the bottom of the body engaging said partitions for holding them against swinging.

12. A dumping vehicle including, an elongate body, endless upper conveyor chains carried by the body, partitions pivotally suspended from the chains in the body, means for travelling said chains to move said partitions longitudinally of the body, travelling means along the bottom of the body engaging said partitions for holding them against swinging, means on the body for stopping the travel of the chains, and means carried by one of said chains for engaging said stopping means.

13. A dumping vehicle including, an elongate body having upright sides and a floor, upper and lower conveying means movable longitudinally in the body, a plurality of spaced transverse partitions each extending continuously across and within the body to confine batches of material therebetween, said partitions being pivotally suspended from the upper conveying means and detachably connected with the lower conveying means, driving means for the conveying means to move the partitions rearwardly in the body, and means for intermittently stopping the driving means to impart a step by step travel to the partitions to individually dump the batches of material.

14. A dumping vehicle as set forth in claim 13, and tracks along the upper portions of the sides of the body for supporting the partitions after the batches of material are dumped.

15. A dumping vehicle including, an elongate body having upright sides and a floor, upper and lower conveying means movable longitudinally in the body, a plurality of spaced transverse partitions, each extending continuously across and within the body to confine batches of material therebetween, hangers pivoted to the upper conveyor means and attached to the upper ends of the partitions, retainers carried by the lower conveying means and having pivoted members engaging the lower portions of the partitions.

16. As a sub-combination in a dumping vehicle, an elongate body having a floor, an endless chain traveling above and below said floor, spaced members carried by and projecting from the chain, and brackets pivoted to the chain adjacent said members each having a roller for confining a partition against the adjacent member.

17. A dumping vehicle including, an elongate body having a floor and upright sides, a plurality of spaced transverse partitions, endless chains carried by the body and pivotally supporting the partitions, means for moving the chains to move the partitions rearwardly in the body to dump material, and means for swinging the partitions toward a horizontal position along the sides of the body after dumping material.

18. A dumping vehicle including, an elongate body having a floor and upright sides, upper endless chains mounted in the sides of the body, a lower endless chain on the floor of the body, spaced partitions, pivotal connections between the upper chains and the partitions, whereby said partitions carried uprightly in said body, projections on the lower chain detachably engaging said partitions in the body, supports on the body sides for the upper chains, whereby said partitions are swung toward a horizontal position on said sides after dumping material from the body, and means for intermittently moving said chains.

19. A dumping vehicle including, an elongate body having a floor and upright sides, upper endless chains mounted on sides of the body, a lower endless chain on the floor of the body, spaced partitions, pivotal connections between the upper chains and the partitions, whereby said partitions are carried uprightly in said body, projections on the lower chain detachably engaging said partitions in the body, supports on the body sides for the upper chains, whereby said partitions are swung toward a horizontal position on said sides after dumping material from the body, the means for moving the chains including a clutch, a fluid actuator for the clutch, an operating valve connected with the fluid actuator, and spaced devices mounted on one of the upper chains for engaging and actuating said valve.

20. In combination with a dumping vehicle body having endless chains and transverse spaced partitions carried by the chains, control and driving mechanism for the chains including, a motor, driving connections for the chains, a clutch connected with the motor and the driving connections, a pressure fluid actuator connected with the clutch, a hand operator connected with the fluid actuator, pressure conductors on the body attached to the actuator, a dumping valve connected in one of the conductors, and means for supplying pressure fluid to the conductors.

21. The combination set forth in claim 20, with a stop valve connected in another of said conductors for stopping movement of the chains in one direction, a return stop valve connected in still another of said conductors for stopping movement of the chains in a reverse direction.

EDWIN B. SNEAD.

REFERENCES CITED

The following references are of record in the file of this patent:

UNITED STATES PATENTS

| Number | Name | Date |
|---|---|---|
| 397,997 | Nevin | Feb. 19, 1889 |
| 1,116,406 | Fleischer | Nov. 10, 1914 |
| 1,355,488 | McKenney | Oct. 12, 1920 |
| 1,924,927 | Harm et al. | Aug. 29, 1933 |
| 1,987,262 | MacEachen | Jan. 8, 1935 |
| 2,258,988 | LeLaurin | Oct. 14, 1941 |
| 2,284,853 | Wall | June 2, 1942 |
| 2,400,502 | Hapman | May 21, 1946 |

FOREIGN PATENTS

| Number | Country | Date |
|---|---|---|
| 527,916 | Great Britain | Oct. 18, 1940 |
| 152,437 | Switzerland | Apr. 16, 1932 |